United States Patent [19]
Alix et al.

[11] Patent Number: 6,117,403
[45] Date of Patent: Sep. 12, 2000

[54] BARRIER DISCHARGE CONVERSION OF HG, SO₂ AND NOX

[75] Inventors: Francis R. Alix, Greenland; S. Edward Neister, New Durham; Christopher R. McLarnon, Exeter, all of N.H.

[73] Assignee: Zero Emissions Technology Inc., New Durham, N.H.

[21] Appl. No.: 09/214,358

[22] PCT Filed: Oct. 9, 1997

[86] PCT No.: PCT/US97/18263

§ 371 Date: Dec. 29, 1998

§ 102(e) Date: Dec. 29, 1998

[87] PCT Pub. No.: WO98/15357

PCT Pub. Date: Apr. 16, 1998

Related U.S. Application Data

[60] Provisional application No. 60/027,905, Oct. 9, 1996.

[51] Int. Cl.⁷ ............................... B03C 3/00; B03C 3/16
[52] U.S. Cl. ................. 423/210; 423/235; 423/242.1; 423/215.5; 422/169; 422/172; 422/174; 204/157.3; 204/157.46; 204/157.49; 204/174; 204/177; 95/59; 95/65; 95/75; 96/53; 96/77; 96/79; 96/86
[58] Field of Search ............................ 422/168–172, 422/178, 174; 95/59, 65, 75; 96/53, 77, 79, 86; 423/210, 235, 242.1, 215.5; 204/157.3, 157.46, 157.49, 174, 177

[56] References Cited

U.S. PATENT DOCUMENTS

| | | |
|---|---|---|
| 3,745,751 | 7/1973 | Zey et al. . |
| 3,856,476 | 12/1974 | DeSeversky . |
| 3,981,815 | 9/1976 | Taniguchi et al. . |
| 4,351,810 | 9/1982 | Martinez et al. . |
| 4,650,555 | 3/1987 | Rzad et al. . |
| 4,885,139 | 12/1989 | Sparks et al. . |
| 4,925,639 | 5/1990 | Stauffer . |
| 5,137,546 | 8/1992 | Steinbacher et al. . |
| 5,147,516 | 9/1992 | Mathur et al. . |
| 5,512,144 | 4/1996 | Stauffer . |
| 5,601,791 | 2/1997 | Plaks et al. . |

OTHER PUBLICATIONS

McLarnon, Christopher R., Nitrogen Oxide Decomposition by Barrier Discharge, Dissertation for Doctor of Philosophy Degree in Chemical Engineering, University of New Hampshire, May 1996.

Penetrante, Bernie M., Effect of Electrical Parameters on the Chemical Kinetics of Plasma–Based Air Pollution Control, Applications of Electrostatics for Control of Gas Phase Air Pollutants Workshop, Cincinnati, Ohio, Aug. 22, 1997.

Helfritch, Dennis J., Plasma Technologies Applied to Air Pollution Control, Applications of Electrostatics for Gas Phase Air Pollutants Workshop, Cincinnati, Ohio, Aug. 22, 1997.

Monroe, Larry S., et al., Testing of a Combined Dry and Wet Electrostatic Precipitator for Control of Fine Particulate Emissions from a Coal–Fired Boiler, EPRI–DOE–EPA Combined Utility Air Pollutant Control Symposium, Washington, DC, Aug. 25–29, 1997.

(List continued on next page.)

*Primary Examiner*—Hien Tran
*Attorney, Agent, or Firm*—Phillip E. Decker

[57] ABSTRACT

A process and apparatus for reducing particulate, nitrogen oxides ("NOx"), sulfur dioxide ("$SO_2$"), and mercury ("Hg") emissions from the combustion exhaust of fossil fuel fired plants while producing an end product that is commercially useful, comprising the steps of oxidizing Hg, NOx and $SO_2$ using a barrier, pulse, corona, or electron beam electrical discharge apparatus (100) to produce HgO and the acids $HNO_3$ and $H_2SO_4$ collecting the HgO, acids and particulates in a wet ESP (120), and separating the particulates from the collected acid mixture, then separating and concentrating the acids for industrial use.

28 Claims, 6 Drawing Sheets

OTHER PUBLICATIONS

Masuda, S. et al., "Pulse Corona Induced Plasma Chemical Process . . . ," Proceedings 3rd International Conference on Electrostatic Precipitation, Padova, Italy, pp. 667–676, Oct. 1987.

Urabe, T. et al. "Experimental Studies on Mercury Vapor Removal by Corona Discharge . . . ", Chemical Abstracts, vol. 109, #236097, Oct. 1987.

Dhali, S.K., et al. "Dielectric Barrier Discharge for Processing of SO2/NOx", Journal of Applied Physics, vol. 69, pp 6319–6324, May 1991.

BARRIER DISCHARGE CONVERSION OF HG, $SO_2$ AND NOX

This application claims the benefit of U.S. Provisional Application No. 60/027,905, filed Oct. 9, 1996.

BACKGROUND a. Field of the Invention

This invention relates to pollution control equipment used for reducing particulate matter, nitrogen oxides ("NOx"), sulfur dioxide ("$SO_2$"), and mercury ("Hg") emissions from the burning of fossil fuels.

b. Description of the Related Art

Electric utilities, and industrial plants typically burn fossil fuels like coal to produce electric power and heat for process requirements. Burning fossil fuel produces an emissions stream containing a number of noxious substances as by-products. These substances include fine particulate matter, mercury and oxides of nitrogen and sulfur. Fine particulate matter has been shown in a recent study to contribute to the early deaths of 64,000 people in the United States alone. Oxides of nitrogen, generally known as NOx, result in the formation of ground level ozone, $O_3$, which is toxic when inhaled. Oxides of sulfur, generally known as $SO_2$, are also a problem. Both NOx and $SO_2$ compounds contribute to the formation of acid rain, which is harmful to plant life, animal life, and property. Mercury, in very small concentrations, has been shown to be highly toxic to humans.

The typical methods of reducing fine particulate matter emissions is by the use of an electrostatic precipitator (ESP) or fabric filter bag houses. The typical methods of reducing $SO_2$ emissions are wet or dry scrubbers, burning low-sulfur coal, and employing flue gas desulfurization (FGD) apparatuses. Burning low-sulfur coal reduces the particulate collection efficiency of the ESP, and is generally more expensive than ordinary coal. FGD equipment is very expensive to build and operate. The typical method of reducing NOx emissions is the use of special low NOx burners to cool the combustion temperature to a point where the bonds of $N_2$ present in the combustion air are less likely to be broken. This has the disadvantage of making combustion less efficient and increases particulate emissions. Expensive selective catalytic and non-catalytic reduction systems using ammonia and urea injection have also been tried. These devices are very expensive to purchase and operate. They can also require large amounts of space at the plant site to install. Altogether, current methods for reducing fine particle, $SO_2$ and NOx emissions can increase the cost of electricity produced at an electric utility by over fifty percent.

Stauffer, in U.S. Pat. No. 4,925,639, that issued on May 15, 1990, disclosed a process for removing NOx from flue gas and making $HNO_3$ as a useful by-product. The process involved cyclically subjecting the gas to scrubbing with nitric acid and then electrolyzing the dissolved nitric oxide to form more nitric acid. This process has the disadvantage that it only treats one type of pollution.

A few have tried to remove multiple pollutants from a flue gas stream. Plaks et al., in U.S. Pat. No. 5,601,791, that issued on Feb. 11, 1997, discloses a process and apparatus that neutralizes "acid gases" such as $SO_2$ inside an existing ESP. Plaks et al. spray a neutralizing agent upstream from the ESP collecting plates to collect particulates, neutral salts, and unreacted neutralizing agent. The material collected on the plates is then washed using a spray in the manner of a wet ESP. This process and apparatus does not purposefully create and collect the acids, which are valuable industrial materials. Instead, the resulting effluent is sent to a landfill for disposal.

Sparks et al., in U.S. Pat. No. 4,885,139, that issued on Dec. 5, 1989, discloses a method for removing $SO_2$ and other "acid gases" from flue gas by a multi-stage ESP within a single housing. In that method, a neutralizing agent is sprayed upstream from the ESP collecting plates, forming neutral salts which dry before being collected by the plates. In this manner $SO_2$ and particulates are removed from the flue gas. However, like Plaks et al., no effort is made to form $H_2SO_4$ from the $SO_2$, and the effluent must be sent to a landfill for disposal. Nor do either of them refer to the removal of NOx or the formation of $HNO_3$ in this manner.

The deleterious health effects of these noxious pollutants become better understood as more medical research is completed. As a result, environmental regulations world-wide are being made more stringent. Although mercury emissions from fossil fuel fired boilers are not yet regulated, this is likely to change as research has shown that over 20 percent of mercury emissions in the United States come from coal fired power plants. When the environmental regulations become more stringent, the cost of compliance increases. More expensive pollution control equipment must be purchased and maintained which does not provide any monetary return to the plant owner.

While environmental compliance costs continue to rise, there is a movement toward consolidating ownership of power plants world-wide and increasing competition. As a result, capital expense budgets are often slashed in an effort to keep the cost of producing electricity low. A pollution control process and apparatus that can provide a monetary return to the owner while reducing particulate, NOx, and $SO_2$ emissions would solve several serious problems at the same time.

To date, a limited number of plants have been able to sell collected particulate matter commercially. Of the gases, only $SO_2$ has been converted to useful products that can provide a monetary return. It has been used in the manufacture of gypsum and in the recovery of elemental sulfur. Also, dilute acids have been manufactured from exhaust gases by catalytic reactions. These methods are limited, and are not widely used.

For the foregoing reasons, there is a need for a process and apparatus for reducing particulate, NOx, and $SO_2$ emissions from the combustion of fossil fuel while producing an end product that is commercially useful and eliminating the need to dispose of an environmentally undesirable by-product.

SUMMARY

The present invention is directed to a process and apparatus that satisfies the need to reduce particulate, $SO_2$, NOx and Hg emissions from combustion of fossil fuel while producing a commercially useful end product. A process that reduces particulate, NOx, $SO_2$ and Hg emissions comprises the steps of oxidizing NOx and $SO_2$ to produce the acids $HNO_3$ and $H_2SO_4$, and oxidizing Hg to HgO using a barrier, pulse, corona, or electron beam electrical discharge apparatus, collecting the acids and particulates in a wet ESP, separating the particulates from the wet ESP effluent, then separating and concentrating the acids for industrial use. The converting apparatus and wet ESP are preferably installed inside an existing ESP casing to conserve space. These and other features, aspects, and advantages of the present invention will become better understood with reference to the following drawing and description.

DRAWINGS

DESCRIPTION

Figure 1:
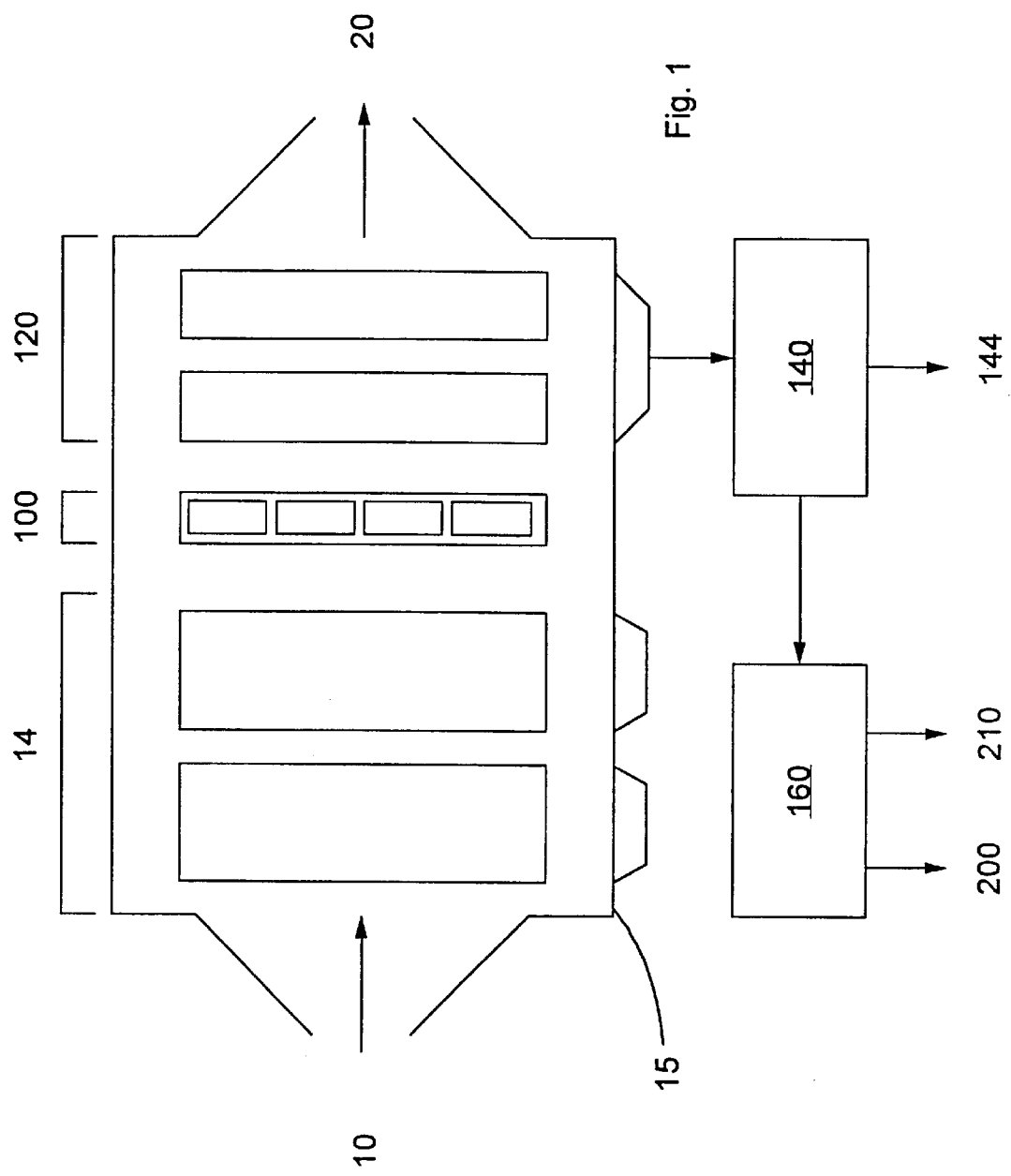
FIG. 1 is a cut-away view of an ESP casing with the dry ESP sections, electrical converter, and wet ESP sections inside, and with the wet ESP effluent separating and processing apparatuses shown in block diagram form.

The present invention is a process and apparatus for reducing particulate, NOx, (including $NO_2$), $SO_2$ and Hg emissions from the combustion exhaust of fossil fuel fired plants which produces commercially valuable acids as reaction products. Turning to FIG. 1, flue gas 10 is created by the combustion of fossil fuel in a boiler. Fuels that are typically used in electric utilities and industrial plants include coal and oil, but may comprise other substances like gas, tires, trash, or biomass. Flue gas 10 enters an electrostatic precipitator casing (ESP) 15 and a standard dry ESP 14 removes approximately 90% of the particulate ash.

In the preferred embodiment, the last fields of the existing dry ESP are removed to make room for the electrical converting apparatus 100 and wet ESP section 120. The converting apparatus 100 oxidizes NOx, $SO_2$, and Hg present in the flue gas to $HNO_3$, $H_2SO_4$, and HgO. The acids, and most of the fine particles not collected by the dry ESP 14 are collected in the wet ESP 120. The wet ESP 120 also collects HgO, $NO_2$ gas, and $SO_2$ gas. Having had most of the NOx, $SO_2$, and particulate matter removed, the flue gas exits the precipitator at 20 with greatly reduced amounts of NOx, $SO_2$, and Hg and almost no particles. As an alternative to the preferred embodiment, the converter 100 and wet ESP 120 can be installed outside the existing ESP casing 15. Yet another alternative is to follow the converter 100 and wet ESP 120 sections with an additional converter and wet ESP section, either inside or outside the ESP casing 15, in order to obtain a desired conversion efficiency.

The effluent from the wet ESP 120 is collected in a collection hopper as a mixture and travels to a separator apparatus 140, where the particulates and HgO 144 are removed. The separator apparatus may comprise a settling tank, a filter, a centrifuge, or any combination of the three as is commonly practiced in the art. A mineral removal apparatus may be used to remove HgO from the mixture.

The remaining mixture travels to a processing apparatus 160, that separates the $HNO_3$ and $H_2SO_4$, and concentrates them for industrial use. The result is concentrated $H_2SO_4$ 200 and concentrated $HNO_3$ 210.

Figure 2:
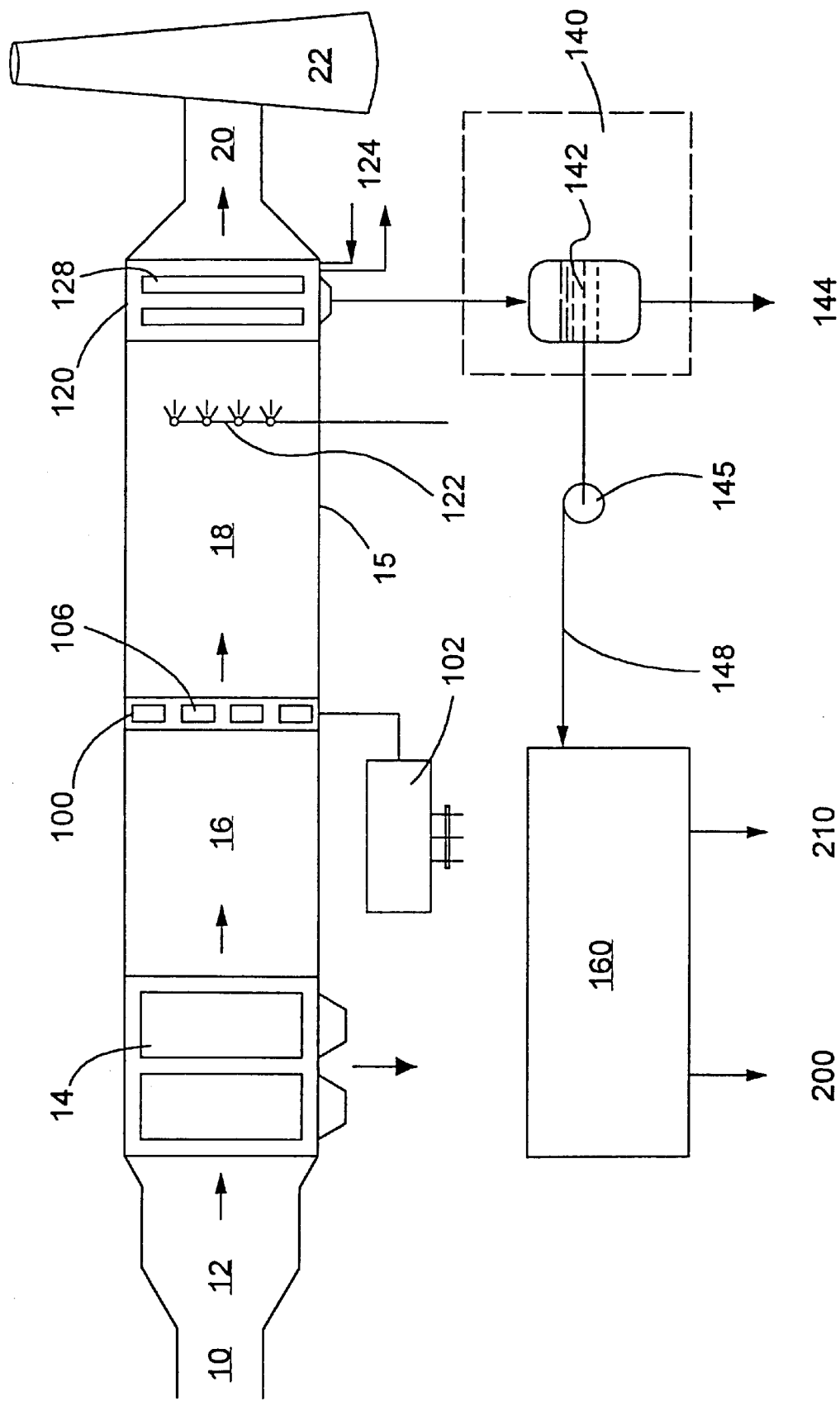
FIG. 2 is a cut-away view like in FIG. 1 but showing more details.

Turning to FIG. 2, the composition of the flue gas 12 before the dry ESP 14 is primarily particulate ash, $N_2$, $CO_2$, $H_2O$, $O_2$, $SO_2$, NOx, Hg and other trace heavy metals. After the dry ESP 14 and before the converter apparatus 100, the composition of the flue gas 16 is primarily fine particles, $N_2$, $CO_2$, $H_2O$, $O_2$, $SO_2$, NOx, Hg and other trace heavy metals.

The electrical converter apparatus 100 is a series of flat plate, barrier discharge electrodes formed in stacks 106. The electrodes are energized by a power supply 102 that converts station-provided, three-phase power into high voltage alternating current power. The power supply is electrically connected to the converter apparatus. The voltage supplied to the converter is preferably between about 15,000 and about 50,000 volts root mean square (RMS) at a frequency between about 50 Hz and about 10 kHz. The preferred embodiment operates at about 1 kHz. Operating at a higher frequency reduces the size and cost of the high voltage transformer required.

In using barrier electrical discharge, high voltage alternating current is applied to electrodes which are separated by a gas space and a dielectric barrier. The voltage can be applied in any one of several waveforms, including but not limited to sine, square, triangle, and pulsed voltages. Other types of electrical discharge apparatuses that may be employed for converting NOx and $SO_2$ to acids include, but are not limited to, pulse, corona, and electron beam discharge and radio frequency, microwave, and ultraviolet light radiation sources. Neither barrier electrical discharge nor the other named energy sources have been used to reduce both NOx and $SO_2$ in the fossil fuel boilers of electric utilities and industrial plants before. That it is useful in these applications is surprising and unexpected.

The major chemical reactions in the conversion of NOx to $HNO_3$ are as follows:

(1) $O_2 + e \rightarrow O + O + e$
(2) $H_2O + e \rightarrow OH + H + e$
(3) $NO + O \rightarrow NO_2$
(4) $NO_2 + O \rightarrow NO_3$
(5) $NO_2 + OH \rightarrow HNO_3$
(6) $NO_3 + NO_2 \rightarrow N_2O_5$
(7) $N_2O_5 + H_2O \rightarrow 2HNO_3$ The major chemical reactions in the conversion of $SO_2$ to $H_2SO_4$ are as follows:

(1) $SO_2 + O \rightarrow SO_3$
(2) $SO_2 + OH \rightarrow HSO_3$
(3) $HSO_3 + OH \rightarrow H_2SO_4$
(4) $SO_2 + HO_2 \rightarrow HSO_4 \rightarrow H_2SO_4$
(5) $SO_3 + H_2O \rightarrow H_2SO_4$ The composition of the flue gas 18 after the electrical converter but before the wet ESP 120 is primarily fine particles, $N_2$, $CO_2$, $H_2O$, $O_2$, a fraction of the original $SO_2$, a fraction of the original NOx (predominantly in the form of $NO_2$), HgO, $H_2SO_4$ and $HNO_3$. Note that the converter apparatus 100 converted Hg present in the flue gas to HgO that is readily collected in the wet ESP 120.

An evaporative cooling spray injection apparatus 122 sprays water, an acid mixture, or both into the flue gas just before it reaches the wet ESP 120. This spray acts to cool the flue gas to a temperature below the sulfuric and nitric acid dew points so that acid aerosols will form in the gas stream. This permits subsequent collection of acids in the wet ESP section. Spraying a dilute nitric and sulfuric acid spray also scrubs additional $SO_2$ and $NO_2$ from the flue gas. Like the dry ESP 14, the wet ESP 120 comprises a plurality of plates 128 between which are high voltage, preferably rigid, electrodes. In the preferred embodiment, the plates are subcooled below the temperature of the flue gas, for example, by the use of cooling water 124 provided at the station. In this manner the acids in the composition of the flue gas 18 tend to condense on the surfaces of the wet ESP plates 128. This apparatus is known as a "condensing" wet ESP. Very little of the pollutants in the composition of the flue gas 18 exit the ESP 120 and go into the environment through the stack 22.

The effluent 126 from the wet ESP is primarily a slurry or mostly-liquid mixture of dilute $H_2SO_4$, dilute $HNO_3$, scrubbed $SO_2$, fine particles, and HgO. It travels to a separation apparatus 140. The mixture is separated by a settling tank, centrifuge, or filter 142. The resulting solids 144 are removed and safely disposed of or recycled. The remaining dilute acids 148 are transported by an optional pump 146 to a processing apparatus 160 that separates the acids and concentrates them to produce $HNO_3$ 210 and $H_2SO_4$ 200.

Figure 3:
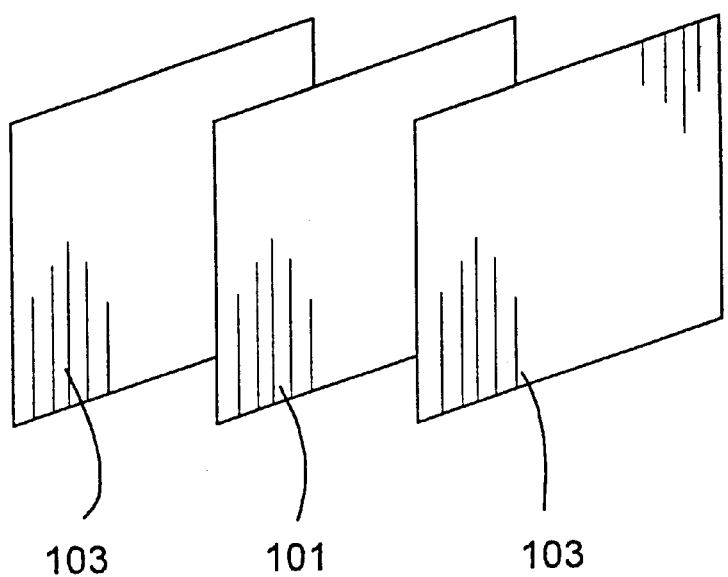
FIG. 3 is a detail view of flat plate, barrier discharge electrodes.

FIG. 3 shows a converter cell comprising a high voltage, flat plate electrode 101 connected to the high voltage power supply 102 (not shown) secured at a distance from two flat plate grounded electrodes 103. Although the flat plate electrode configuration is the preferred embodiment, other embodiments are also possible. They include cylindrical high voltage electrodes and flat plate ground electrodes, and cylindrical high voltage electrodes centered in the middle of cylindrical ground electrodes. The plates are preferably mounted in a vertical position to prevent plugging with particulate matter. The high voltage electrodes 101 and ground electrodes 103 may have identical construction, and differ only in that one is wired to the power supply 102 and the other is wired to ground. In operation, the high voltage and ground electrodes would alternate along the entire row, and have ground electrodes at the end. Another configuration is to have alternating electrodes attached to opposite ends of the secondary windings of a high voltage, mid point ground transformer. The significant requirement is that a high voltage gradient exist between the electrodes.

Figure 4:
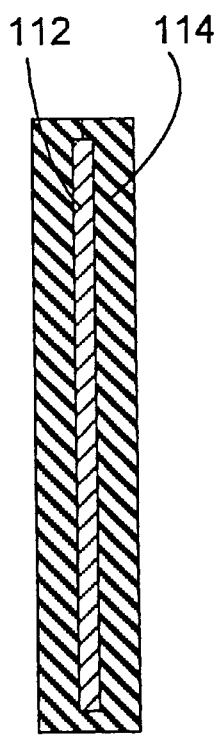
FIG. 4 is a width-wise sectional view of a flat plate, barrier discharge electrode surrounded by high dielectric strength insulating material.
Figure 5:
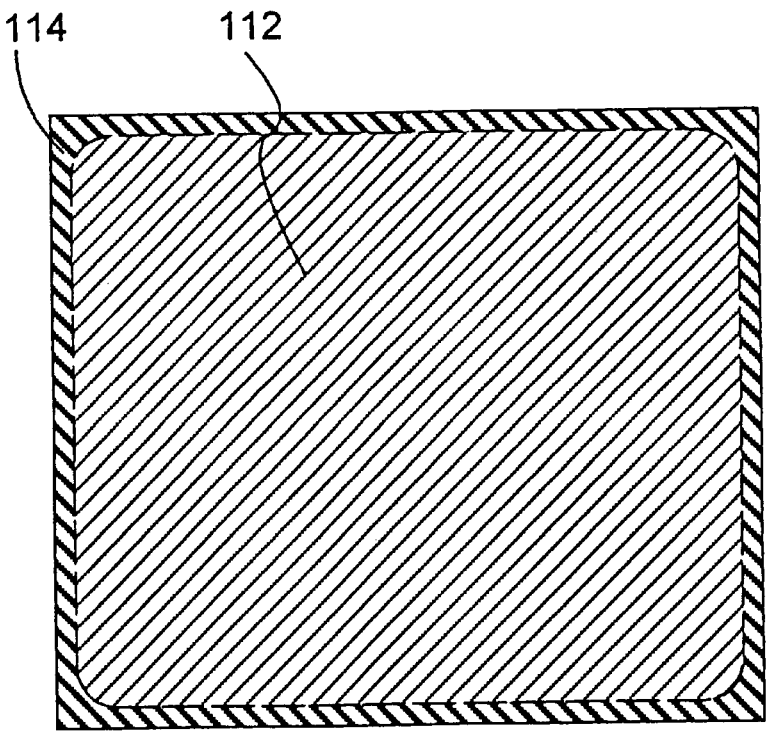
FIG. 5 is a length-wise sectional view of a flat plate, barrier discharge electrode surrounded by high dielectric strength insulating material.

FIGS. 4 and 5 are cut-away sectional views of the preferred flat plate electrodes. The electrode itself 112 may be made of any conductive metal. Instead of using flat plates, conductive wire mesh screens, conductive inks or epoxy strips may also be used. The high dielectric barrier 114 is important for providing sufficient energy to convert NOx and $SO_2$ into the chemical species that will result in the formation of $HNO_3$ and $H_2SO_4$. The high electric material is applied over all the surfaces of the electrodes. The preferred embodiment uses mica as the dielectric material. However, quartz, alumina, titania, fused silica, and ceramic may also be used.

Figure 6:
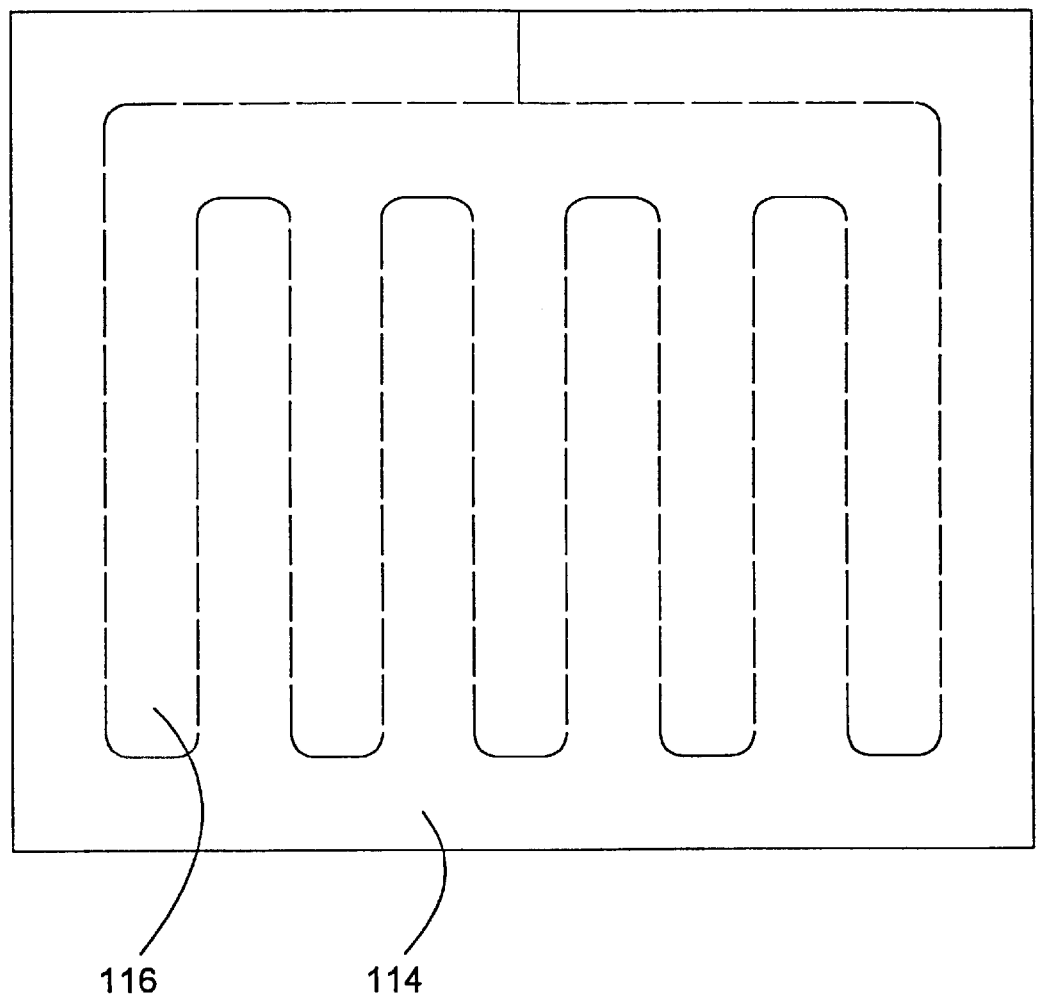
FIG. 6 is a side view of an electrode assembly having spaced electrode conductors surrounded by high dielectric strength insulating material.

FIG. 6 is an alternative to the flat plate electrode 112. This embodiment uses a flat, spaced electrode conductor 116 surrounded by the high dielectric barrier 114.

Figure 7:
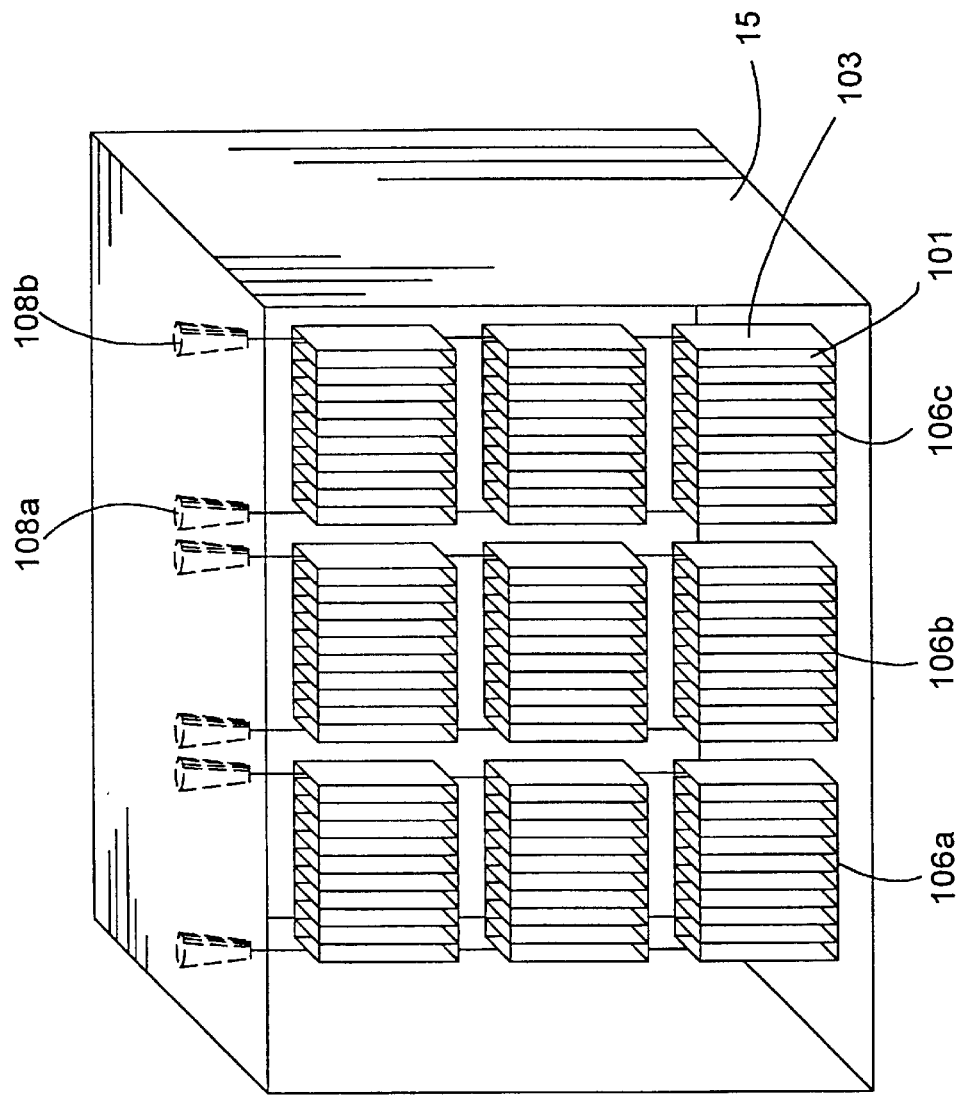
FIG. 7 is a perspective view of the electrical converter assembly stacks inside an ESP casing.

FIG. 7 shows a perspective view of converter stack assemblies 106a, 106b, and 106c installed inside a precipitator casing 15. The assemblies comprise short rows of plates, preferably about 90 cm in length, with the plates preferably spaced from each other by about 1.3 cm. The plates themselves are preferably about 104 cm in height and less than about 30 cm in width. The plates are high voltage plates 101 and either ground or opposite polarity high voltage plates 103. The arrangement of the plates may comprise alternating ground 103 and high voltage plates 101, alternating across the rows with ground plates 103 on the end. Alternatively, each high voltage plate 101 may be surrounded by two ground plates 103 on either side.

The rows are supported by a mechanical structure (not shown) and suspended by insulators 108a and 108b from the top of the casing 15 so that the plane of the plates is parallel to the flow direction of the flue gas within the casing. In this manner, a maximum amount of the flue gas is treated by the converter with a minimum pressure drop across the apparatus. A plurality of rows may be mechanically fastened together, one on top of the other, to form a stack 106 that reaches substantially from the top to the bottom of the casing, which is typically about nine to about twelve meters in height. Although not shown, the plates of each row, and each row, are electrically connected to provide the desired input power from the power supply 102.

A plurality of stacks 106 may be used and installed side by side to substantially cover the width of the casing. The number of plates, rows, and stacks shown in FIG. 7 are for illustration only, and it is appreciated that different quantities of plates, rows, and stacks may be required for different sized casings.

Figure 8:
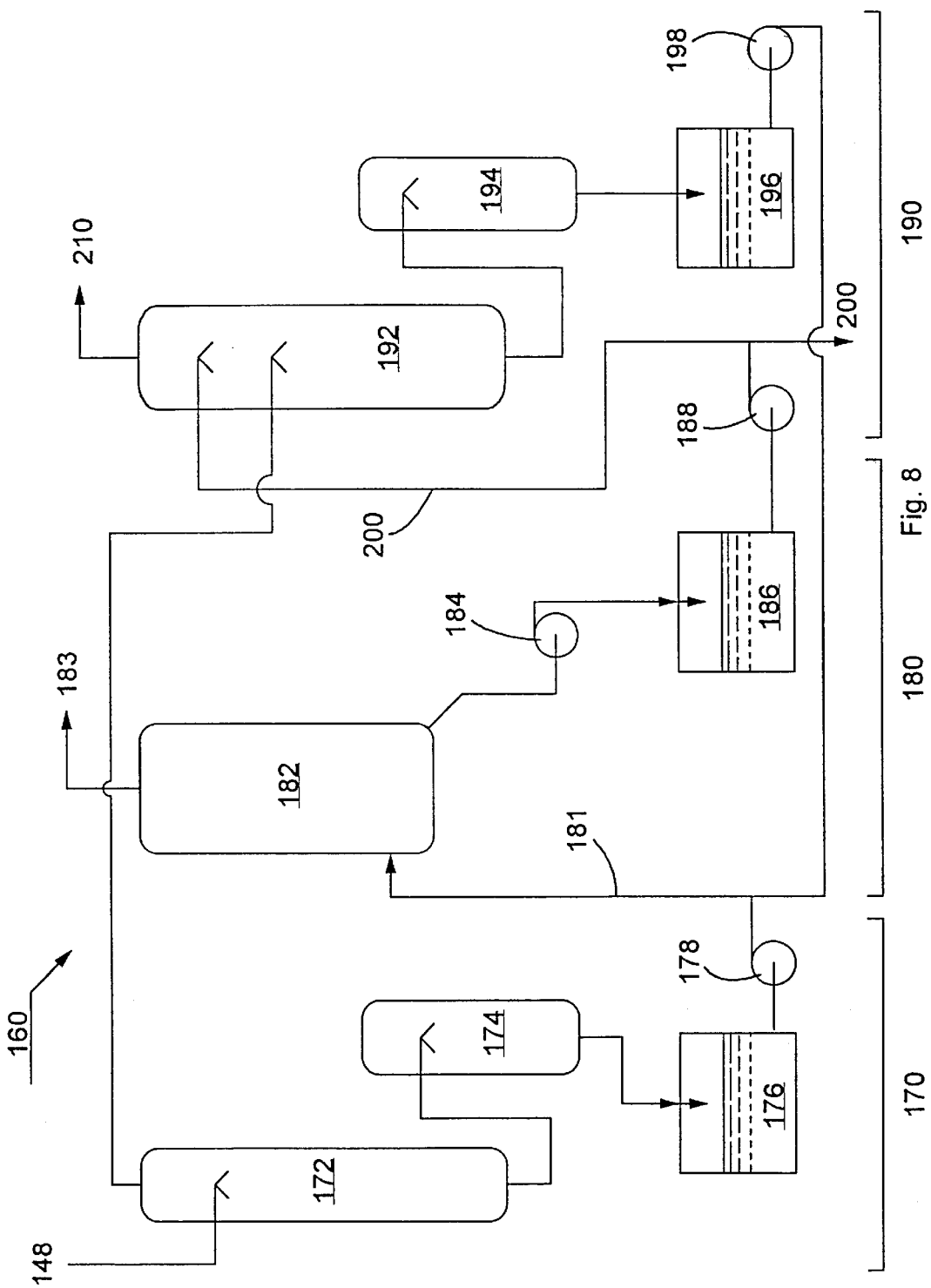
FIG. 8 is a process diagram of the processing apparatus for separating and concentrating $HNO_3$ and $H_2SO_4$.

FIG. 8 is a schematic diagram of the preferred embodiment of a processing apparatus 160 for separating and concentrating $HNO_3$, and $H_2SO_4$ from the dilute acids 148 output from the separator 140. The schematic only shows the mass flow, and not the energy flow, but it is understood by those skilled in the art that heat exchangers and condensers can be used in these apparatuses to facilitate the desired separation and concentration of acids. Other apparatuses and processes are also suitable for separating and concentrating the acids, as is understood by those skilled in the art. The elements are hydraulically connected, in that fluids may be conveyed by acid-resistant pipes, hoses, and containers. Pumps are shown in various places, however they are optional and could be replaced by gravity feed or other fluid conveying means.

In FIG. 8, the preferred embodiment processing apparatus 160 has three distinct sections: a denitration apparatus 170, $H_2SO_4$ concentration apparatus 180, and $HNO_3$ concentration apparatus 190. In the denitration apparatus 170, the dilute acids 148 enter a processing tower 172 that has two outputs. A first output is hydraulically connected to a stripping column 174 input. The stripping column 174 output is hydraulically connected to a pump tank 176 input. The pump tank 176 output is hydraulically connected to an acid pump 178 input. From the acid pump 178 output flows weak, denitrated $H_2SO_4$ 181.

In the $H_2SO_4$ concentration apparatus 180, weak denitrated $H_2SO_4$ 181 flows into a separator 182 having two outputs. The separator 182 input is hydraulically connected to the denitration unit acid pump 178 output. The separator 182 first output is hydraulically connected to a transfer pump 184 input. The transfer pump 184 output is hydraulically connected to a pump tank 186 input. The pump tank 186 output is hydraulically connected to an acid pump 188 input. From the acid pump 188 output comes concentrated $H_2SO_4$ 200, suitable for industrial use. Distillate $H_2O$ 183 flows from the separator 182 second output.

In the $HNO_3$ concentration apparatus 190, concentrated $H_2SO_4$ 200 enters a first input of a processing tower 192. The processing tower 192 first input is hydraulically connected to the $H_2SO_4$ concentration apparatus acid pump 188 output. The processing tower 192 second input is hydraulically connected to the denitrating apparatus processing tower 172 second output to supply weak $HNO_3$ to the $HNO_3$ concentration apparatus 190. From a second output of the processing tower 192 comes concentrated $HNO_3$ 210, suitable for industrial use. The processing tower 192 first output is hydraulically connected to a stripping column 194 input. The stripping column 194 output is hydraulically connected to a pump tank 196 input. The pump tank 196 output is hydraulically connected to an acid pump 198 input. The acid pump 198 output is hydraulically connected to the $H_2SO_4$ concentration apparatus separator 182 input.

It will be apparent to those skilled in the art that various changes and modifications can be made without departing from the spirit of the present invention. Accordingly, it is intended to encompass within the appended claims all such changes and modifications that fall within the scope of the present invention.

We claim:

1. A process for removing particulate, Hg, NOx, and $SO_2$ emissions from a flue gas stream and collecting the resulting acids for industrial use comprising the steps of
   a. oxidizing Hg, NOx and SOx in a flue gas stream using an electrical converting apparatus to HgO, $HNO_3$ and $H_2SO_4$;
   b. collecting particulate emissions, HgO, $NO_2$, $SO_2$, $HNO_3$, and $H_2SO_4$ in a wet electrostatic precipitator (ESP), forming a mixture;
   c. separating the particulate emissions and HgO from the mixture; and
   d. processing the mixture by separating $HNO_3$ and $H_2SO_4$ from each other and concentrating $HNO_3$ and $H_2SO_4$, and thereby removing particulate, Hg, NOx, and $SO_2$ emissions from the flue gas stream and producing acids for industrial use.

2. The process of claim 1, wherein the electrical converting apparatus is at least one taken from the group consisting of barrier, pulse, corona, and electron beam electrical discharge sources and radio frequency, microwave, and ultra-violet light radiation sources.

3. The process of claim 1, further comprising the step of collecting particulate emissions with a conventional electrostatic precipitator located upstream from the electrical converting apparatus.

4. The process of claim 1, wherein the oxidizing step comprises oxidizing NOx and $SO_2$ using a barrier discharge to initiate the chemical reactions resulting in the formation of $HNO_3$ and $H_2SO_4$.

5. The process of claim 4, wherein the oxidizing is performed using a high voltage, alternating current power source at a frequency between about 50 Hz and about 10 kHz.

6. The process of claim 4, wherein the oxidizing is performed at an input of between about 15,000 volts and about 50,000 volts RMS.

7. The process of claim 1, wherein the wet electrostatic precipitator is a condensing wet electrostatic precipitator having at least one collecting plate having two surfaces, said plate comprising a mechanism for cooling the surfaces of the plate.

8. The process of claim 7 further comprising the steps of injecting an evaporative cooling spray of a dilute $HNO_3$ and $H_2SO_4$ mixture upstream from the collecting plate; subcooling the surfaces of the plate below the temperature of the flue gas; condensing $H_2O$, $HNO_3$ and $H_2SO_4$ onto the plate surfaces forming a condensate; and entraining particulate emissions in the condensate, forming a mixture.

9. The process of claim 1, the collecting step comprising the step of scrubbing $SO_2$ and $NO_2$ from the flue gas stream in the wet ESP.

10. The process of claim 1, the separating step comprising the step of removing the HgO from the mixture using a mineral removal apparatus.

11. An apparatus for removing particulate, Hg, NOx, and $SO_2$ emissions from a flue gas stream and collecting the resulting acids for industrial use comprising
   a. an electrical converting apparatus installed within an electrostatic precipitator casing for converting Hg, NOx and $SO_2$ to HgO, $HNO_3$ and $H_2SO_4$;
   b. a wet electrostatic precipitator having a collection hopper installed within the casing downstream of the electrical converting apparatus for collecting particulates, HgO, $HNO_3$ and $H_2SO_4$ in a mixture;
   c. a separating apparatus outside the casing hydraulically connected to the collection hopper for separating the particulates and HgO from the $HNO_3$ and $H_2SO_4$ in the mixture; and
   d. a processing apparatus hydraulically connected to the separating apparatus for separating $HNO_3$ and $H_2SO_4$ from each other and concentrating $HNO_3$ and $H_2SO_4$, thereby removing particulate, Hg, NOx, and $SO_2$ emissions from the flue gas stream and producing acids for industrial use.

12. The apparatus of claim 11, wherein the electrical converting apparatus is taken from a group consisting of barrier, pulse, corona, and electron beam electrical discharge sources.

13. The apparatus of claim 11, wherein the electrical converting apparatus is taken from a group consisting of radio frequency, microwave, and ultra-violet light radiation sources.

14. The apparatus of claim 11, further comprising a conventional electrostatic precipitator located within the casing and upstream from the electrical converting apparatus.

15. The apparatus of claim 11, wherein the electrical converting apparatus is a barrier discharge excitation apparatus that oxidizes NOx and $SO_2$ and initiates the chemical reactions resulting in the formation of $HNO_3$ and $H_2SO_4$.

16. The apparatus of claim 15, wherein the barrier discharge excitation is performed by a high voltage, alternating current power source at a frequency between about 50 Hz and about 10 kHz.

17. The apparatus of claim 15, wherein the barrier discharge excitation is performed at an input of between about 15,000 volts and about 50,000 volts RMS.

18. The apparatus of claim 15, wherein the barrier discharge excitation apparatus comprises a high voltage, alternating current power source; electrically connected to at least one high voltage electrode surrounded by a high dielectric barrier; secured at a distance from at least one grounded electrode.

19. The apparatus of claim 18, wherein the high voltage and ground electrodes are substantially parallel sheets of electrically conductive material, and the high dielectric barrier is made of a material taken from the group consisting of glass, fused silica, ceramic, and mica.

20. The apparatus of claim 19, wherein the high voltage and ground electrodes are substantially parallel screen plates.

21. The apparatus of claim 19, wherein the high voltage and ground electrodes are substantially parallel planar spaced strip conductors.

22. The apparatus of claim 11, wherein the wet electrostatic precipitator is a condensing wet electrostatic precipitator having at least one collecting plate having two surfaces, said plate comprising a mechanism for cooling the surfaces of the plate.

23. The apparatus of claim 22, further comprising an evaporative cooling spray injection system upstream from the collecting plate for cooling the flue gas temperature below the dew point for $HNO_3$ and $H_2SO_4$; scrubbing $SO_2$, $NO_2$, and HgO from the gas stream; condensing water, $HNO_3$ and $H_2SO_4$ onto the plate surfaces forming a condensate; and entraining particulate emissions in the condensate, forming a mixture.

24. The apparatus of claim 11, wherein the separating apparatus is at least one taken from a group consisting of a filter, a settling tank, and a centrifuge.

25. The apparatus of claim 11, said processing apparatus for separating $HNO_3$ and $H_2SO_4$ from each other and concentrating $HNO_3$ and $H_2SO_4$ comprising a denitration apparatus, an $H_2SO_4$ concentration apparatus, and an $HNO_3$ concentration apparatus.

26. The apparatus of claim 25, said denitration apparatus for producing denitrated $H_2SO_4$ comprising a processing tower having an input and a first and second output, the processing tower input hydraulically connected to the separating apparatus; a stripping column having an input and an output, the stripping column input hydraulically connected to the processing tower first output; a pump tank having an input and an output, the pump tank input hydraulically connected to the stripping column output; and an acid pump having an input and output, the acid pump input hydraulically connected to the pump tank output, thereby producing denitrated $H_2SO_4$ from the acid pump output.

27. The apparatus of claim 26, said $H_2SO_4$ concentration apparatus comprising a separator having an input, a first output and a second output, the separator input hydraulically connected to the output of the denitration apparatus acid pump; a transfer pump having an input and an output, the input of the transfer pump hydraulically connected to the separator first output; a pump tank having an input and an output, the input of the pump tank hydraulically connected to the output of the transfer pump, and an acid pump having an input and an output, said acid pump input connected to the pump tank output, thereby producing concentrated $H_2SO_4$ from the acid pump outlet, and distillate $H_2O$ from the separator second output.

28. The apparatus of claim 27, said $HNO_3$ concentration apparatus comprising a processing tower having a first and second input and a first and second output, the processing tower first input hydraulically connected to the $H_2SO_4$ acid pump outlet, the processing tower second input hydraulically connected to the denitration apparatus processing tower second output; a stripping column having an input and an output, the stripping column input hydraulically connected to the processing tower first output; a pump tank having an input and an output, the pump tank input hydraulically connected to the stripping column output; and an acid pump having an input and an output, the acid pump input hydraulically connected to the pump tank output, and the acid pump output hydraulically connected to the denitration apparatus acid pump output, thereby producing concentrated $HNO_3$ from the processing tower second output.

\* \* \* \* \*